United States Patent
Soyer et al.

(10) Patent No.: US 6,530,757 B1
(45) Date of Patent: *Mar. 11, 2003

(54) HOUSING FOR A FUEL PUMP DRIVEN BY AN ELECTRIC MOTOR

(75) Inventors: Wolfgang Soyer, Wiernsheim; Michael Kuehn, Bietigheim-Bissingen; Christine Mayer; Ingo Richter, both of Markgroeningen, all of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/701,316

(22) PCT Filed: Mar. 31, 2000

(86) PCT No.: PCT/DE00/00984
§ 371 (c)(1),
(2), (4) Date: Nov. 28, 2000

(87) PCT Pub. No.: WO00/60231
PCT Pub. Date: Oct. 12, 2000

(30) Foreign Application Priority Data

Apr. 3, 1999 (DE) .......................................... 199 15 258

(51) Int. Cl.$^7$ ................................................ F04B 17/00
(52) U.S. Cl. ..................... 417/423.14; 439/86; 439/933
(58) Field of Search ....................... 417/423.14; 439/86, 439/87, 933, 607

(56) References Cited

U.S. PATENT DOCUMENTS

| | | | |
|---|---|---|---|
| 3,507,582 A | | 4/1970 | Jeep .......................... 417/366 |
| 4,465,331 A | * | 8/1984 | Masuda et al. ........... 339/14 R |
| 4,596,519 A | | 6/1986 | Tuckey ......................... 418/15 |
| 5,013,222 A | * | 5/1991 | Sokol et al. ................ 417/366 |
| 5,180,313 A | * | 1/1993 | Brandt ........................ 439/125 |
| 5,415,906 A | * | 5/1995 | Miyakawa et al. ........ 428/35.7 |
| 5,697,769 A | * | 12/1997 | Kobman et al. ............ 417/410 |
| 5,880,937 A | * | 3/1999 | Schadhauser et al. ....... 361/794 |
| 6,099,757 A | * | 8/2000 | Kulkarni ..................... 252/500 |
| 6,129,074 A | * | 10/2000 | Frank .......................... 123/509 |
| 6,129,948 A | * | 10/2000 | Plummer et al. ........... 427/202 |

FOREIGN PATENT DOCUMENTS

| | | |
|---|---|---|
| DE | 34 17 255 A | 11/1985 |
| DE | 44 44 854 A1 * | 6/1996 |
| DE | 198 13 204 A | 9/1999 |
| DE | 198 43 021 C | 3/2000 |
| EP | 0 899 144 A | 3/1999 |

* cited by examiner

Primary Examiner—Charles G. Freay
Assistant Examiner—Han L Liu
(74) Attorney, Agent, or Firm—Michael J. Striker

(57) ABSTRACT

An electric-motor-driven housing for a feed pump (1), in particular for a feeding device for fuel, is proposed in which on the commutator side there is a connection cap (5) for the electrical connection contacts (3, 4) and pump inlets and/or outlets (6). The connection cap (5) comprises an electrically conductive plastic, and a connection to a ground potential can be established via an electrically conductive connection. The surface resistance of the connection cap (5) is designed such that a diversion of electrostatic discharge to the ground potential, with attendant shielding from electromagnetic radiation, ensues, and a predeterminable short-circuit current between the electrical connection contacts (3, 4) located directly on the connection cap (5) is not exceeded.

6 Claims, 1 Drawing Sheet

HOUSING FOR A FUEL PUMP DRIVEN BY AN ELECTRIC MOTOR

PRIOR ART

The invention relates to an electric-motor-driven housing for a feed pump, in particular for a feeding device for fuel, as generically defined by the preamble to the main claim.

In such feeding devices, the fuel is pumped from a fuel tank, for instance to an injection system of the internal combustion engine of a motor vehicle. One such feeding device is known from German Patent Disclosure DE 44 44 854 A1, in which the feed pump is driven by an electric motor. In these arrangements, it is important that no electrical discharge events, which can cause ignition of the fuel or of the fuel-air mixture in the tank, occur. The corresponding diversion of electrostatic discharges is difficult to achieve in components that for the most part, for engineering reasons, are made from plastic and are electrically only poor conductors or even nonconductors.

The direct current electric motor of the known feed pump is typically also closed on the commutator side by a connection cap of nonconductive plastic, with a surface resistance of greater than $10^{14}$ ohms, and thus cannot be used to divert electrostatic discharge to the ground potential of the feeding device, nor can it shield against electromagnetic radiation, for instance in the high-frequency range. Another possibility is that the housing of the feed pump could be applied to ground potential by means of an additional contact baffle, but no shielding action at the connection cap can be achieved by making this provision. A fully conductive cap would entail excessive expense in this respect.

ADVANTAGES OF THE INVENTION

The housing described at the outset for a feed pump driven by an electric motor, in particular for a feeding device for fuel, is advantageously refined with the characteristics of the body of claim 1, in which the connection cap on the commutator side, on which the electrical connection contacts and pump inlets and/or outlets are mounted, is made from an electrically conductive plastic. Via an electrically conductive connection, a connection with a ground potential can then be made in a simple way.

The surface resistance of the connection cap is selected according to the invention such that a diversion of electrostatic discharge to the ground potential is assured at little engineering effort or expense. Thus shielding against electromagnetic radiation in the high-frequency range can be accomplished as well, in a simple way. Since for production it is advantageous if the electrical connection contacts rest directly on the connection cap, without any further insulation, it can be assured by means of a correct choice of the surface resistance that a predeterminable short-circuit current, for instance approximately 0.1 A, between the connection contacts is not exceeded. The surface resistance of the connection cap is preferably in the range of $10^4$ ohms.

According to the invention, the connection cap can have an electrical contact over the entire surface or at a plurality of points on the circumference with the further electrically conductive parts of the housing of the feed pump or of the electric motor, in order to improve the shielding and diversion still more. The conductive plastic of the connection cap can for instance be a polyamide or polyoxymethylene provided with conductive metal or carbon fibers.

These and further characteristics of preferred refinements of the invention are disclosed not only in the claims but also in the description and the drawings; the individual characteristics can each independently or in groups be used to make subsidiary combinations in the embodiment of the invention and in other fields and can represent both advantageous and independently patentable embodiments for which patent protection is claimed here

DRAWING

DESCRIPTION OF THE EXEMPLARY EMBODIMENT

Figure 1:
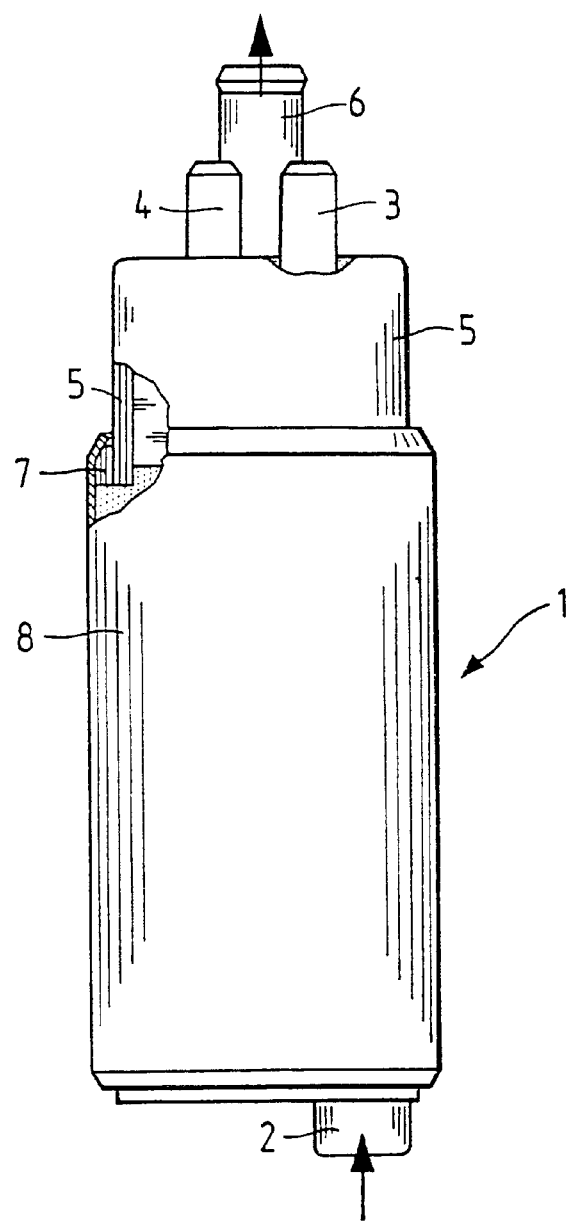
FIG. 1 is a front elevation view.
Figure 2:
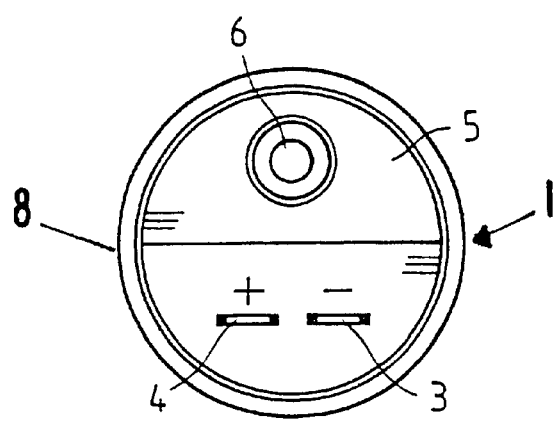
FIG. 2 is a plan view of the feed pump in accordance with the present invention.

A feed pump 1 shown in the drawing can for instance be installed in a fuel feeding device that is described in German Patent Disclosure DE 44 44 854 A1 addressed at the outset as prior art.

The feed pump 1 is installed in the lower region of a fuel tank, so that the feed pump 1 can aspirate the fuel out of the bottom region of the tank into an inlet 2. The feed pump 1 is driven by an electric motor. The electric motor is connected via one connection contact 3 to the negative pole and via another connection contact 4 to the positive pole of the voltage supply, which is especially clear from the bottom view in the drawing on a connection cap 5, toward the commutator, of the housing.

The connection cap 5 is made according to the invention from a conductive plastic, for instance a polyamide provided with conductive metal or carbon fibers; the surface resistance of the connection cap 5 is in the range of $10^4$ ohms. Thus a diversion of electrostatic discharge from the connection cap 5 to the ground potential can be accomplished, and at the same time shielding from electromagnetic radiation can be assured.

The electrical connection contacts 3 and 4 are disposed directly on the connection cap 5, without further insulation, next to an outlet 6 for the fuel to be pumped; here, by the choice of material for the connection cap 5, a predeterminable short-circuit current, such as approximately 0.1 A. The connection cap 5 in the exemplary embodiment shown is connected over a large area via a connecting point 7, under conditions of electrical contact, with a lower, as a rule metal housing part 8 of the feed pump 1 or of the electric motor.

What is claimed is:

1. An electric-motor-driven housing for a feed pump (1), comprising:
a connection cap (5) having electrical connection contacts (3, 4) arranged directly on said connection cap without further insulation and pump inlets and/or outlets (6) disposed on a commutator side of said housing, wherein the connection cap (5) comprises an electrically conductive plastic, and wherein said connection cap (5) is connected to a ground potential via an electrically conductive connection.

2. The housing of claim 1, wherein a surface resistance of the connection cap (5) has a selected value, thereby forming a diversion of electrostatic discharge from the connection cap (5) to the ground potential, wherein said connection cap is shielded from electromagnetic radiation, and wherein the surface resistance value prevents exceeding of a predeterminable short-circuit current between the electrical connection contacts (3, 4) located directly on the connection cap (5).

3. The housing of claim 2, wherein the surface resistance of the connection cap (5) is in the range of $10^4$ ohms.

4. The housing of claim 1, wherein the connection cap (5) has an electrical contact over an entire surface or at a plurality of points on the circumference with further electrically conductive parts (7) of the housing of the feed pump (1).

5. The housing of claim 1, wherein said plastic includes metal or carbon fibers for providing conductivity.

6. The housing as defined in claim 1, wherein the plastic is selected from the group consisting of polyoxymethylene or polyamide.

* * * * *